US008589960B2

(12) United States Patent
Yamauchi et al.

(10) Patent No.: US 8,589,960 B2
(45) Date of Patent: Nov. 19, 2013

(54) OPTICAL DISC DRIVE

(75) Inventors: Yoshiaki Yamauchi, Omitama (JP); Seiji Hamaie, Kawasaki (JP); Ikuo Nishida, Ebina (JP); Koji Matsumoto, Tokyo (JP); Hideyuki Nagamine, Urayasu (JP)

(73) Assignees: Hitachi Consumer Electronics Co., Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 13/432,230

(22) Filed: Mar. 28, 2012

(65) Prior Publication Data
US 2013/0007777 A1    Jan. 3, 2013

(30) Foreign Application Priority Data
Jun. 29, 2011    (JP) .................................. 2011-144741

(51) Int. Cl.
*G11B 33/02*        (2006.01)
(52) U.S. Cl.
USPC .......................................................... 720/613
(58) Field of Classification Search
USPC .......................................................... 720/613
See application file for complete search history.

(56) References Cited

U.S. PATENT DOCUMENTS

| 7,020,884 B2* | 3/2006 | Choi et al. | 720/613 |
| 7,600,235 B2* | 10/2009 | Ide et al. | 720/613 |
| 7,725,908 B2* | 5/2010 | Harada et al. | 720/610 |
| 8,141,108 B2* | 3/2012 | Yokota et al. | 720/613 |
| 8,332,879 B2* | 12/2012 | Matsumoto et al. | 720/610 |
| 2003/0117928 A1* | 6/2003 | Choi et al. | 369/75.2 |
| 2005/0213438 A1* | 9/2005 | Ide et al. | 369/24.01 |

FOREIGN PATENT DOCUMENTS

| JP | 2002-269961 A | 9/2002 |
| JP | 2006-024304 A | 1/2006 |

* cited by examiner

*Primary Examiner* — Mark Blouin
(74) *Attorney, Agent, or Firm* — Mattingly & Malur, PC

(57) ABSTRACT

A disc drive for suppressing warpage deformation of a disc tray generated as initial deformation during molding is provided. A supporting structure of a disc tray 4 provided to be inserted into and ejected from a drive housing 1' through a tray insertion/ejection opening 15 is provided with guide mechanisms 12a and 12b which slidably support a tray body 4a in the depth direction as viewed from the tray insertion/ejection opening 15 in an interior space of the drive housing 1', and a protrusion 21 which is slidably contacted to an upper end of the guide mechanism 12a on a lower surface of a wing part 4b protruding from the tray body 4a on the side where a disc protrudes in the width direction.

8 Claims, 5 Drawing Sheets ic disc drive.

OPTICAL DISC DRIVE

BACKGROUND OF THE INVENTION

1. Field of the Invention

The present invention relates to an optical disc drive for recording and reproducing information. More particularly, the present invention relates to a tray-type optical disc drive in which an optical disc is placed on a tray ejected from a drive housing and the tray is inserted into the drive housing.

2. Background Art

JP Patent Publication (Kokai) No. 2002-269961 (Patent Document 1) and JP Patent Publication (Kokai) No. 2006-24304 (Patent Document 2) disclose a conventional optical disc drive.

The optical disc drive disclosed in Patent Document 1 is intended to provide a bezel covering up a tray insertion/ejection opening of a drive housing, the bezel being easily removably fixed to a disc tray. In the optical disc drive disclosed in Patent Document 1, the bezel is engaged with the tray by a hook piece formed on the bezel engaging with a hook receiving part formed on the tray and the bezel is locked to the tray by a lock piece formed on the bezel engaging with a lock receiving part formed on the tray.

The optical disc drive disclosed in Patent Document 2 is intended to prevent the misalignment between a tray and a tray cover that occurs when an external load is applied and the deformation of the tray and the tray cover due to shock in the disc loading direction, so as to suppress difficulty in storing the tray inside a housing. The optical disc drive disclosed in Patent Document 2 includes at least the drive housing, the tray to be stored inside the drive housing or to be inserted into and ejected from the drive housing, and the tray cover provided on the tray, in which a contact fixed portion is provided on at least part of a portion where the tray is in contact with the tray cover.

The tray-type optical disc drive as described above has been gradually thinner, smaller, and lighter as electronic devices and other components mounted in the drive have been thinner, smaller, and lighter. For reducing the weight and cost, a disc tray on which an optical disc is placed and which is inserted into a drive housing is generally formed by resin molding.

For reducing the weight and cost, for example, the disc tray is formed to be thin by resin molding and has the width smaller than the outer diameter of the optical disc so that a part of the optical disc protrudes from the tray (see FIG. 3 of Patent Document 1 and FIG. 1 of Patent Document 2). The surface of the disc tray has a complicated shape with locally-thin parts and locally-thick parts corresponding to an opening and asperities provided to attach a unit mechanism including components such as an optical pickup for recording and reproducing information on the optical disc and a spindle motor for rotating the optical disc.

Such a disc tray, which is formed to be thin by resin molding and has a complicated surface shape as described above, is likely to be largely warped in initial deformation during injection molding due to difference in cooling and solidifying speed between parts caused by difference in thickness between the parts or due to difference in molding shrinkage rate between the parts.

When the disc tray is warped in the initial deformation, the position where the bezel is attached to the disc tray by engaging means is changed by the effect of the initial deformation of the disc tray, and accordingly, the disc tray cannot be accurately fitted to a tray insertion/ejection opening. Thus, the disc tray cannot be smoothly inserted into or ejected from the drive housing.

Even when the disc tray can be inserted into the drive housing, the drive performance in terms of vibration and noise during operation may be adversely affected as long as the disc tray is warped in the initial deformation in the drive housing.

An object of the present invention, which has been made to solve the above-described problems, is to provide an optical disc drive in which the inclination of a bezel attached to a disc tray and the warpage deformation of the disc tray occurred in initial deformation during molding are suppressed.

SUMMARY OF THE INVENTION

To solve the above-described problems, an optical disc drive is structured to insert a disc tray into a drive housing or eject the disc tray from the drive housing through an opening and cover the opening with a bezel attached to the disc tray when the disc tray is stored in the drive housing. The disc tray includes a tray body on which a disc is mounted and from which the disc protrudes and a wing part protruding from the tray body on a side where the disc protrudes, the tray body and the wing part being integrally molded with the disc tray. For inserting the disc tray into the drive housing or ejecting the disc tray from the drive housing through the opening, guide mechanisms that slidably support the tray body are provided to define a supporting structure for supporting the wing part of the disc tray in the drive housing when the disc tray is stored in the drive housing via the guide mechanisms. Accordingly, the initial deformation of the disc tray, especially the warpage deformation of the wing part, is suppressed. Thus, the wing part of the disc tray receives a pressing force from the supporting structure for suppressing the warpage deformation as the initial deformation when the disc tray is stored in the drive housing.

When the disc tray is inserted into the drive housing through the opening, the wing part of the disc tray on the side where the bezel is attached receives the pressing force from the supporting structure. Accordingly, the warpage deformation as the initial deformation of the wing part can be suppressed. Thus, the inclination of the front bezel attached to the disc tray can be reduced. The vibration or noise generated between the disc tray and the guide mechanisms during recording and reproducing operation of the optical disc drive can be also suppressed by the pressing force received by the wing part of the disc tray from the supporting structure. Consequently, a reliable optical disc drive which can prevent the reduction of the appearance and performance and solve the problems such as vibration and noise can be obtained.

DETAILED DESCRIPTION OF THE PREFERRED EMBODIMENTS

Figure 1:
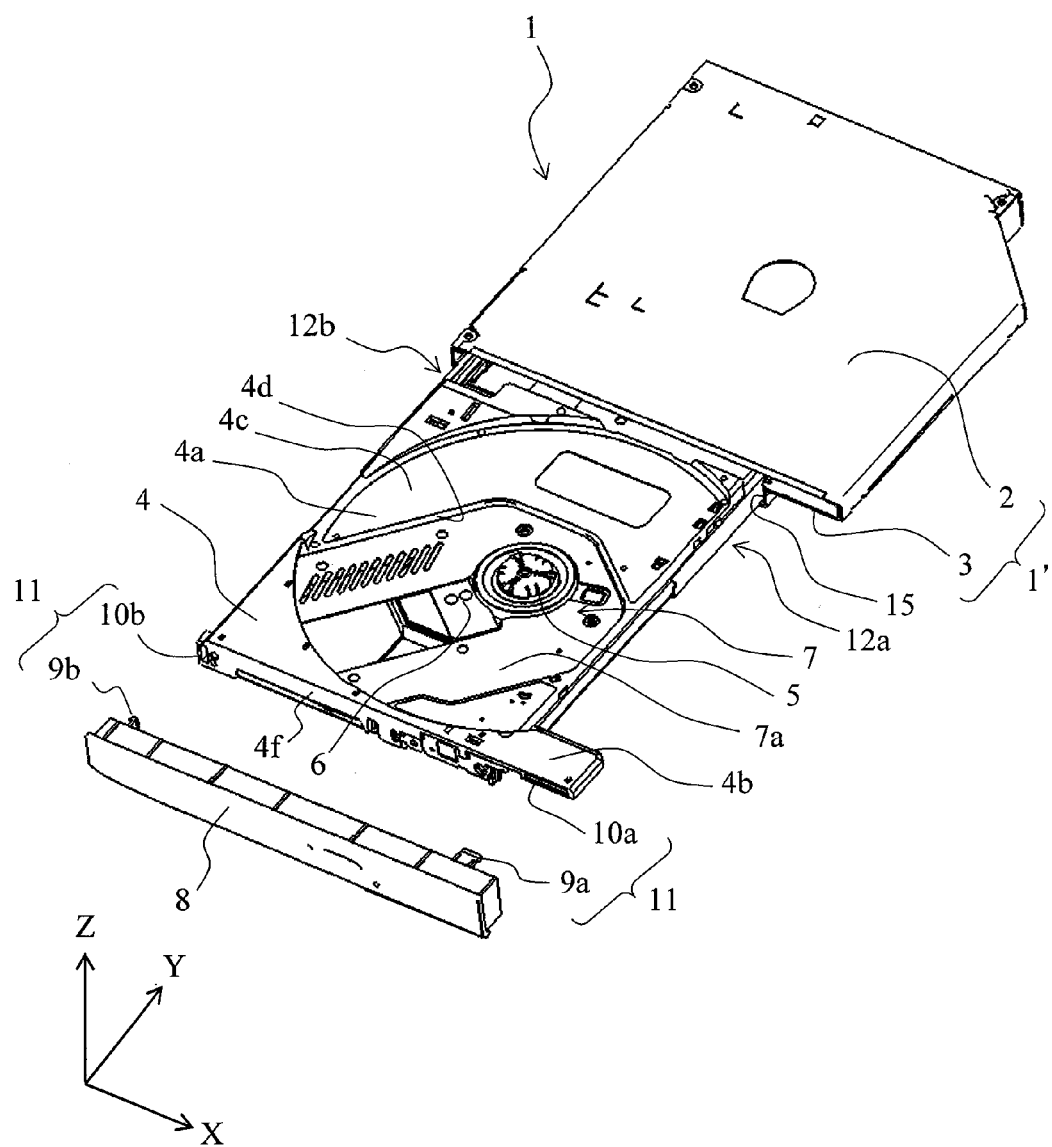
FIG. 1 is an exploded perspective view showing an optical disc drive according to an embodiment of the present invention.

An optical disc drive according to an embodiment of the present invention will be explained below with reference to the accompanying drawings. The same or similar components in the drawings are denoted by the same reference numerals, and the explanation of their basic structures and operations are omitted.

FIG. 1 is an exploded perspective view showing the optical disc drive according to the embodiment of the present invention.

Figure 2:
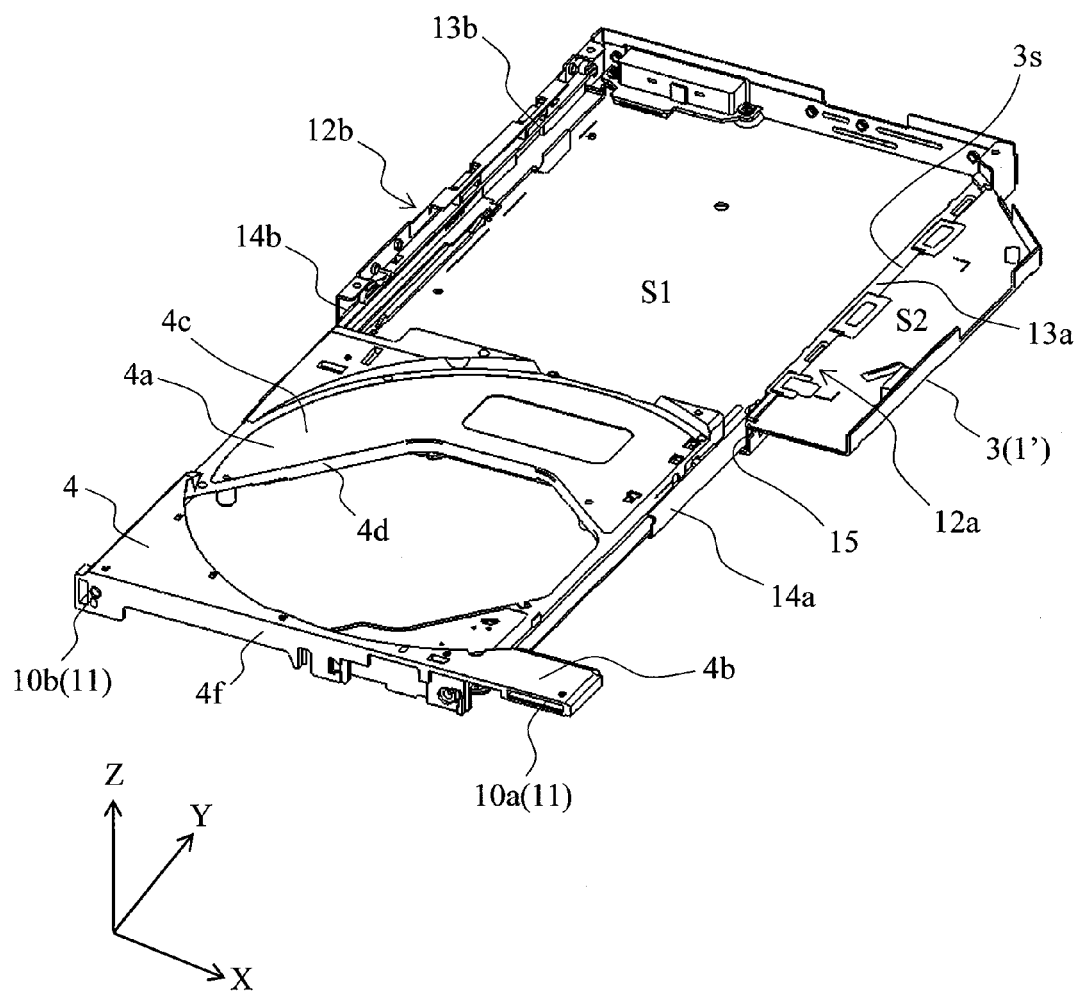
FIG. 2 is an exploded perspective view showing a guide mechanism of a disc tray in the optical disc drive shown in FIG. 1.

FIG. 2 is an exploded perspective view showing a guide mechanism of a disc tray in the optical disc drive shown in FIG. 1. The optical disc drive 1 optically records and reproduces information on a recording surface of an optical disc as a disc-shaped recording medium such as a compact disc (CD), digital versatile disc (DVD), and blu-ray disc (BD) having the diameter of 120 mm and the thickness of 1.2 mm.

The optical disc drive 1 as shown in the drawing includes a drive housing 1' that has a thin box-like shape having the width of 130 mm, the depth of 130 mm, and the height (thickness) of 12.7 mm (or 9.5 mm). The optical disc drive 1 is called as a slim drive or super slim drive mounted in a mobile personal computer.

In FIGS. 1 and 2, the drive housing 1' of the optical disc drive 1 has the shape like a thin box provided by integrally connecting a top case 2 and a bottom case 3. The top case 2 and the bottom case 3 are formed by press molding of a thin steel plate.

One side of the drive housing 1' having the thin box-like shape on the front side of the optical disc drive 1 serves as a tray insertion/ejection opening 15. The X direction, Y direction, and Z direction shown by arrows in the drawing correspond to the width direction, depth direction, and height (thickness) direction of the drive housing 1', i.e., the optical disc drive 1, as viewed from the front side of the tray insertion/ejection opening 15.

The bottom case 3 has a stepped portion 3s extending in the depth direction (i.e., Y direction in the drawing) on a bottom surface of an interior space of the drive housing 1'. The stepped portion 3s includes a lower bottom part and an upper bottom part. The interior space of the drive housing 1' as viewed from the tray insertion/ejection opening 15 in the depth direction (i.e., Y direction in the drawing) includes: a first space S1 having the width of the lower bottom part which is smaller than the outer diameter of the disc in the width direction (i.e., X direction in the drawing) and having the height of the stepped portion 3s; and a second space S2 having the width of the total width of the lower and upper bottom parts which is slightly larger than the outer diameter of the disc in the width direction (i.e., X direction in the drawing). The second space S2 is provided on the first space S1 in the height direction (i.e., Z direction in the drawing) so that one ends of them are aligned in the width direction (i.e., X direction in the drawing). The first and second spaces S1 and S2 are integrated with each other to provide the interior space.

A disc tray 4 on which an optical disc is mounted is slidable in the interior space of the drive housing 1', which is provided with the second space S2 on the first space S1 and is provided with the integrally-connected first and second spaces S1 and S2, through the tray insertion/ejection opening 15 in the depth direction (i.e., Y direction in the drawing) of the drive housing 1'.

The disc tray 4 is formed by resin molding to include a tray body 4a and a wing part 4b which are integrated with each other. The width of the tray body 4a in the width direction (i.e., X direction in the drawing) is smaller than the outer diameter of the optical disc, so that a part of the optical disc protrudes from one side and the tray body 4a can be inserted into the first space S1 in the interior space of the drive housing 1' through the tray insertion/ejection opening 15.

A disc mounting part 4c having the diameter slightly larger than the outer diameter of the optical disc is defined by a circular peripheral wall to be recessed on the upper surface of the tray body 4a in the height (thickness) direction (i.e., Z direction in the drawing). The one side surface of the tray body 4a in the width direction (i.e., X direction in the drawing) which extends in the depth direction (i.e., Y direction in the drawing) serves as a string connecting the ends of the circular peripheral wall of the disc mounting part 4c, and also serves as a side surface of the disc tray 4 on the side where the optical disc mounted on the disc mounting part 4c protrudes.

A mounting hole 4d penetrating the tray body 4a in the height (thickness) direction (i.e., Z direction in the drawing) is positioned at the disc mounting part 4c on the surface of the tray body 4a. The mounting hole 4d includes the diameter center of the circular peripheral wall of the disc mounting part 4c and has the shape like a fan-like opening extending in the radial direction of the disc mounting part 4c.

A unit mechanism 7 is provided on the lower surface, i.e., the back face, of the tray body 4a in the height direction (i.e., Z direction in the drawing). The unit mechanism 7 is fixed to the back face of the tray body 4a via a plurality of elastic insulators (not shown). The insulators lessen the vibration or impact transmitted to the unit mechanism 7 from the outside of the drive, or the vibration or impact transmitted from the unit mechanism 7 to the outside of the drive.

The unit mechanism 7 includes in a unit mechanism chassis (not shown) as a base: a spindle motor 5 for rotating the optical disc; an optical pickup 6 for reproducing information on a disc recording surface and recording the information on the disc recording surface; and a drive mechanism (not shown) for moving the optical pickup 6 in the disc radial direction. A cover 7a that can be fitted to the mounting hole 4d of the tray body 4a is attached to the unit mechanism chassis. The periphery of an engagement shaft of the spindle motor 5 engaged with the optical disc and the periphery of a movement area of the optical pickup 6 moving in the disc radial direction are covered by the cover 7a to conform to the opening shape of the mounting hole 4d of the tray body 4a. The cover 7a also prevents the contact to the drive mechanism or the like, and shuts electrical noise from a circuit thereof.

The unit mechanism 7 is attached to the tray body 4a to face the mounting face of the disc mounting part 4c from the mounting hole 4d such that the cover 7a is fitted to the mounting hole 4d of the tray body 4a, the engagement shaft of the spindle motor 5 is positioned at the diameter center of the circular peripheral wall of the disc mounting part 4c, and the optical pickup 6 moved by drive means is movable in the radial direction of the circular peripheral wall of the disc mounting part 4c.

The wing part 4b is provided on a front surface 4f of the tray body 4a as viewed from the tray insertion/ejection opening 15 in the depth direction (i.e., Y direction in the drawing). The wing part 4b protrudes from the tray body 4a on the side where the disc protrudes in the width direction (i.e., X direction in the drawing) of the drive housing 1'. The wing part 4b is shaped like a thin plate having the thickness smaller than that of the front surface 4f of the tray body 4a in the height (thickness) direction (i.e., Z direction in the drawing) of the tray body 4a. The wing part 4b can be inserted with the optical disc mounted on the disc tray 4 into the second space S2 in the interior space through the tray insertion/ejection opening 15 of the drive housing 1'. More specifically, the wing part 4b can be inserted into the portion of the second space S2 extending from the first space S1 in the width direction (i.e., X direction in the drawing).

The entire width of the disc tray 4 combining the tray body 4a with the wing part 4b in the width direction (i.e., X direction in the drawing) is larger than the diameter of the optical disc so that the optical disc is not brought into contact with the side wall of the interior space of the drive housing 1', and is smaller than the width of the tray insertion/ejection opening 15 or the entire width of the second space S2 in the interior space of the drive housing 1'.

The wing part 4b is inserted into the second space S2 in the interior space of the drive housing 1' with the optical disc mounted on the disc mounting part 4c (to be exact, the optical disc is mounted on the turn table of the spindle motor and is not in contact with the disc mounting part 4c) during recording and reproducing operation of the optical disc drive 1 so as to protect the optical disc rotating and protruding from the tray body 4a for reducing the weight of the disc tray 4.

The disc tray 4 to which the unit mechanism 7 is integrally attached is slidable in the interior space of the drive housing 1' via guide mechanisms 12a and 12b in the depth direction (i.e., Y direction in the drawing). The guide mechanisms 12a and 12b are provided between the both sides of the tray body 4a including the side surface on the side where the disc protrudes in the width direction (i.e., X direction in the drawing) and the inner walls of the end portions of the bottom case 3 forming the both sides of the first space S1 in the interior space of the drive housing 1' in the width direction (i.e., X direction in the drawing).

In FIG. 2, the top case 2 is removed from the drive housing 1', and the unit mechanism 7 and a later-described front bezel 8 are removed from the disc tray 4 for facilitating the understanding of the guide mechanisms 12a and 12b.

As shown in FIG. 2, the guide mechanisms 12a and 12b include guide racks 13a and 13b formed by resin molding and guide rack slides 14a and 14b made of metal.

The guide racks 13a and 13b have guide surfaces. The guide racks 13a and 13b are composed of frame members having a U-shaped or L-shaped cross section as viewed in the longitudinal direction where the guide surfaces extend. The contour part of the frame member having the U-shape or L-shaped cross section is brought into contact with the lower bottom part of the bottom case 3 forming the first space S1 and the side inner wall thereof in the width direction (i.e., X direction in the drawing). The guide surfaces extend in the depth direction (i.e., Y direction in the drawing) of the bottom case 3 so that the open surfaces of the guide surfaces are opposite to each other. The guide rack 13a is fixed on the side where the disc protrudes, and accordingly, the contour part of the frame member having the U-shape or L-shaped cross section for forming the guide rack 13a is in contact with the stepped portion 3s in the interior space of the drive housing 1'. At this time, the upper end of the contour part of the frame member in the height direction (i.e., Z direction in the drawing) faces the second space S2 having the width slightly larger than the outer diameter of the disc in the width direction (i.e., X direction in the drawing) in the interior space of the drive housing 1'.

The guide racks 13a and 13b as described above are composed of the frame members having the U-shaped or L-shaped cross section as viewed in the depth direction (i.e., Y direction in the drawing) of the drive housing 1' which is the direction where the optical disc is inserted and ejected. However, the shape of the cross section is not limited thereto as long as the guide surfaces extend in the longitudinal direction. The frame members may not have the same cross section in the longitudinal direction, and may have cross sections having different shapes and connected to each other.

The guide rack slides 14a and 14b are composed of frame members having a U-shaped cross section as viewed in the depth direction and having guide surfaces extending in the depth direction (i.e., Y direction in the drawing) of the drive housing 1' which is the direction where the optical disc is inserted and ejected. The groove-shaped and U-shaped guide surfaces of the guide rack slides 14a and 14b can be engaged with the both ends of the tray body 4a including the side where the disc on the disc tray 4 protrudes in the width direction (i.e., X direction in the drawing). The contour parts of the frame members having the U-shaped cross section for forming the guide rack slides 14a and 14b are slidably engaged with the guide surfaces of the guide racks 13a and 13b.

When the ends of the tray body 4a including the side where the disc protrudes in the width direction (i.e., X direction in the drawing) are engaged with the groove-shaped guide surfaces of the guide rack slides 14a and 14b, the tray body 4a and the guide rack slides 14a and 14b are relatively movable over a certain distance in the direction where the guide surfaces extend. The disc tray 4 is slidably held by the guide rack slides 14a and 14b over the certain distance in the depth direction (i.e., Y direction in the drawing). When the contour parts of the frame members having the U-shaped cross section for forming the guide rack slides 14a and 14b are engaged with the guide surfaces of the guide racks 13a and 13b, the guide rack slides 14a and 14b are slidably held by the guide racks 13a and 13b over the certain distance in the depth direction (i.e., Y direction in the drawing) in the interior space of the drive housing 1'.

The disc tray 4 is held by the guide mechanism including the guide racks 13a and 13b and the guide rack slides 14a and 14b to be slidable relative to the guide racks 13a and 13b and also slidable relative to the guide rack slides 14a and 14b in the depth direction (i.e., Y direction in the drawing) in the interior space of the drive housing 1' which is the direction where the optical disc is inserted and ejected. Accordingly, the optical disc mounted on the disc mounting part 4c can be inserted into and ejected from the drive housing 1'.

The front bezel 8 is fixed to the front side of the disc tray 4 including the front surface 4f of the tray body 4a and the front end of the wing part 4b in the depth direction (i.e., Y direction in the drawing). When the disc tray 4 is stored in the interior space of the drive housing 1', the front bezel 8 covers the tray insertion/ejection opening 15 of the drive housing 1' to isolate the interior space of the drive housing 1' from the outside.

The front bezel 8 has the shape like a rectangle plate. The front bezel 8 has the width slightly larger than that of the tray insertion/ejection opening 15 in the width direction (i.e., X direction in the drawing) and the height slightly larger than that of the tray insertion/ejection opening 15 in the height direction (i.e., Z direction in the drawing). The front bezel 8 is formed by resin molding as well as the disc tray 4.

First and second hook pieces 9a and 9b protrude on the back face of the front bezel 8, i.e., the surface opposite to the front surface of the disc tray 4, to be spaced from each other in the width direction (i.e., X direction in the drawing). First and second hook piece engagement parts 10a and 10b are formed on the front surface of the disc tray 4 including the front surface 4f of the tray body 4a and the front end of the wing part 4b in the depth direction (i.e., Y direction in the drawing) corresponding to the first and second hook pieces 9a and 9b of the front bezel 8.

The first and second hook pieces 9a and 9b are engaged with the engagement holes of the first and second hook piece engagement parts 10a and 10b on the disc tray 4, so that the front bezel 8 is fixed integrally to the front surface of the disc tray 4. The first and second hook pieces 9a and 9b and the first and second hook piece engagement parts 10a and 10b provide engagement means 11 for fixing the front bezel 8 to the front surface of the disc tray 4.

The first hook piece engagement part 10a is provided on the front end of the wing part 4b in the depth direction (i.e., Y direction in the drawing) and the first hook piece 9a of the front bezel 8 is engaged with the first hook piece engagement part 10a of the wing part 4b. Accordingly, the strength of the wing part 4b, which is shaped like a thin plate and which protrudes from the tray body 4a, is increased.

An eject switch (not shown) for ejecting the disc tray 4 from the interior space of the drive housing 1' through the tray insertion/ejection opening 15 and allowing the disc mounting part 4c to be exposed is arranged on the surface of the front bezel 8. For putting the optical disc on or taking the optical disc off the disc mounting part 4c, the disc tray 4 is ejected through the tray insertion/ejection opening 15 by the operation of the eject switch and the disc mounted on the disc mounting part 4c is ejected from the interior space of the drive housing 1' to be exposed. For reproducing information on the recording surface of the optical disc or recording the information on the recording surface, the disc tray 4 is inserted through the tray insertion/ejection opening 15 and the optical disc mounted on the disc mounting part 4c is stored in the interior space of the drive housing 1'.

The disc tray 4, which includes the mounting hole 4d to which the unit mechanism 7 is fitted, the asperities corresponding to the locally-thin parts and locally-thick parts, and the protruding wing part 4b, has the complicated surface shape. The disc tray 4 is generally integrally formed by injection molding of resin for reducing the cost, size, and weight.

During injection molding of the resin disc tray 4 having the complicated shape, the wing part 4b, which protrudes on the side where the disc protrudes in the width direction (i.e., X direction in the drawing) of the tray body 4a on the front surface 4f of the tray body 4a in the depth direction (i.e., Y direction in the drawing) and which is shaped like a thin plate compared to the tray body 4a, is easily warped considerably in initial deformation. The initial deformation of the wing part 4b is a unique feature caused by molding of plastic resin, and is occurred by difference in cooling and solidifying speed between the molded parts or in shrinkage anisotropy. More specifically, the shrinkage behaviors in the plate-thickness direction and the in-plate direction are different when the molded parts are thin. Also, the shrinkage behaviors in the direction where the resin flows in the in-plate direction and in the direction orthogonal thereto are different in the resin injection-molded parts reinforced by fiber. Thus, the wing part 4b protruding in the width direction (i.e., X direction in the drawing) of the tray body 4a and shaped like a thin plate is easily deformed considerably during injection molding of the resin disc tray 4.

In the disc tray 4 as shown in the drawing, the upper surface of the wing part 4b in the height direction (i.e., Z direction in the drawing) is connected flush with the upper surface of the tray body 4a in the height direction (i.e., Z direction in the drawing) and in the width direction (i.e., X direction in the drawing) of the tray body 4a. On the other hand, the lower surface of the wing part 4b in the height direction (i.e., Z direction in the drawing) protrudes from the side of the tray body 4a in the width direction (i.e., X direction in the drawing), and is connected to the lower surface of the tray body 4a in the height direction (i.e., Z direction in the drawing) via the side portion of the tray body 4a in the width direction (i.e., X direction in the drawing). Accordingly, the disc tray 4 is shaped like a stepped portion as viewed in the depth direction (i.e., Y direction in the drawing) of the tray body 4a.

Accordingly, the wing part 4b which is thinner than the tray body 4a is warped downwardly in the height direction (i.e., Z direction in the drawing) of the tray body 4a relative to the width direction (i.e., X direction in the drawing) of the tray body 4a.

It is preferable that the first hook piece engagement part 10a is provided on the front end of the wing part 4b in the depth direction (i.e., Y direction in the drawing) rather than the front surface 4f of the tray body 4a in the depth direction (i.e., Y direction in the drawing) so as to prevent backlash of the engagement means 11 of the front bezel 8 pushed and pulled during insertion and ejection of the disc tray 4 relative to the front surface of the disc tray 4 and improve the strength of the wing part 4b protruding from the tray body 4a.

When the front bezel 8 is assembled to the front surface of the disc tray 4 including the wing part 4b that is warped in initial deformation, the front bezel 8 is inclined in the height direction (i.e., Z direction in the drawing) relative to the width direction (i.e., X direction in the drawing) of the tray body 4a of the disc tray 4.

In the optical disc drive 1 according to the embodiment, the deformation suppressing structure is provided as described below to suppress the warpage deformation of the wing part 4b as initial deformation of the disc tray 4 and reduce the inclination of the front bezel 8 integrated with the disc tray 4.

FIG. 3 is a diagram showing the deformation suppressing structure of the disc tray according to the embodiment of the present invention.

Figure 3A:
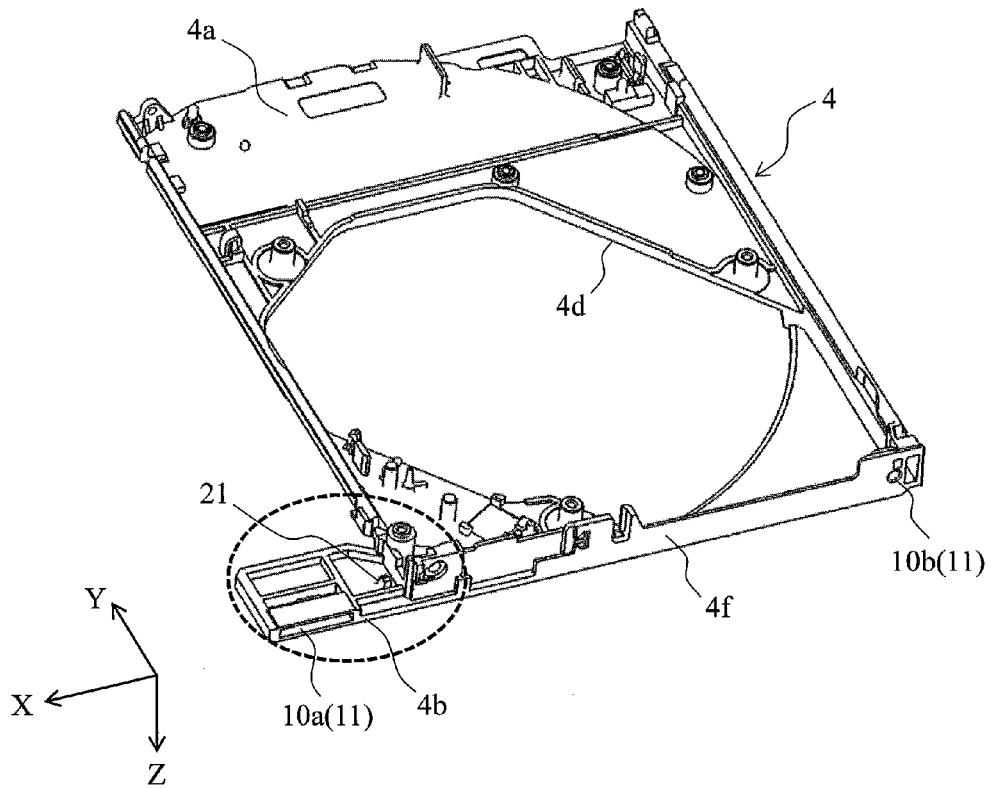
FIG. 3 is a diagram showing a deformation suppressing structure of the disc tray according to the embodiment.
Figure 3B:
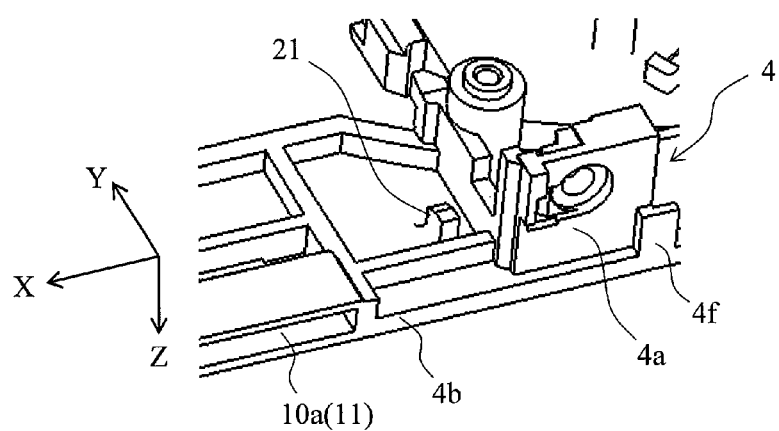

FIG. 3A is a perspective view of the disc tray shown in FIGS. 1 and 2 as viewed from the back side of the disc mounting surface, and FIG. 3B is an enlarged view of the wing part shown by a dashed line in FIG. 3A.

According to the embodiment, the deformation suppressing structure for suppressing the deformation of the wing part 4b is composed of a protrusion 21 which is integrally molded with the wing part 4b on the back face of the wing part 4b and which protrudes toward the lower side in the height direction (i.e., Z direction in the drawing) of the tray body 4a, i.e., toward the bottom case 3.

The protrusion 21 is arranged to be closer to the base end than the distal end of the wing part 4b in its extending direction (i.e., X direction in the drawing), i.e., the width direction (i.e., X direction in the drawing) of the disc tray 4. In other words, the protrusion 21 is arranged at the root portion of the wing part 4b to be closer to the tray body 4a than the first hook piece engagement part 10a.

When the wing part 4b is inserted into the second space S2 in the interior space of the drive housing 1', the protrusion 21 is arranged at the position facing the upper bottom part of the bottom case 3 on the side where the disc protrudes in the width direction (i.e., X direction in the drawing) of the disc tray 4, or at the position facing the upper end portion of the guide rack 13a in the height (thickness) direction (i.e., Z direction) which is fixed to the side where the disc protrudes in the width direction (i.e., X direction in the drawing).

In the drawing, the protrusion 21 is surrounded by ribs extending from the tray body 4a at the front and back sides of the wing part 4b in the depth direction (i.e., Y direction in the drawing) which is the direction where the disc tray 4 is inserted and ejected. The protrusion 21 is arranged at the center of the wing part 4b in the depth direction (i.e., Y direction in the drawing).

The protrusion 21 protrudes toward the bottom case 3 from the back face of the wing part 4b including the ribs and the first hook piece engagement part 10a in the height (thickness) direction (i.e., Z direction in the drawing) of the tray body 4a. When the wing part 4b that is not deformed is inserted into the second space S2 in the interior space of the drive housing 1' and is arranged to face the upper bottom part of the bottom case 3 on the side where the disc protrudes which forms the second space S2, the height of the protrusion is provided to be slidably contacted to the facing portion of the upper bottom part of the bottom case 3. On the other hand, when the wing part 4b is arranged to face the upper end of the guide rack 13a fixed to the side where the disc protrudes in the height direction (i.e., Z direction in the drawing), the height of the protrusion is provided to be slidably contacted to the upper end of the guide rack 13a.

The protrusion 21 has an inclined surface on its distal end for easily running upon the upper bottom part of the bottom case 3 on the side where the disc protrudes or the upper end of the guide rack 13a in the height direction (i.e., Z direction in the drawing). Accordingly, when the wing part 4b is inserted into the second space S2 in the interior space of the drive housing 1' through the tray insertion/ejection opening 15, the situation where the protrusion 21 is engaged with the upper bottom part in the interior space of the drive housing 1' on which the tray insertion/ejection opening 15 is formed, i.e., the front end of the bottom case 3 forming the bottom surface of the second space S2 in the depth direction (i.e., Y direction in the drawing) or the front end of the guide rack 13a fixed to the side where the disc protrudes in the depth direction (i.e., Y direction in the drawing) and the protrusion 21 cannot move further into the second space S2 is prevented.

When the disc tray 4 is inserted into the interior space of the drive housing 1' through the tray insertion/ejection opening 15 in the optical disc drive 1 according to the embodiment, the force which the protrusion 21 receives by slidably contacting the upper bottom part of the bottom case 3 on the side where the disc protrudes or the upper end of the guide rack 13a in the height direction (i.e., Z direction in the drawing) is increased when the wing part 4b is warped in initial deformation as compared when the wing part 4b is not warped in initial deformation.

When the wing part 4b is warped in initial deformation, the protrusion 21 receiving the force stands on the upper bottom part of the bottom case 3 on the side where the disc protrudes or the upper end of the guide rack 13a in the height direction (i.e., Z direction in the drawing) to loosen the wing part 4b in the direction opposite to the direction where the wing part 4b is warped. Thus, the warpage deformation of the wing part 4b on the disc tray 4 can be suppressed in the second space S2.

FIG. 4 is a schematic view showing the deformation suppressing effect of the wing part in the optical disc drive according to the embodiment.

Figure 4A:
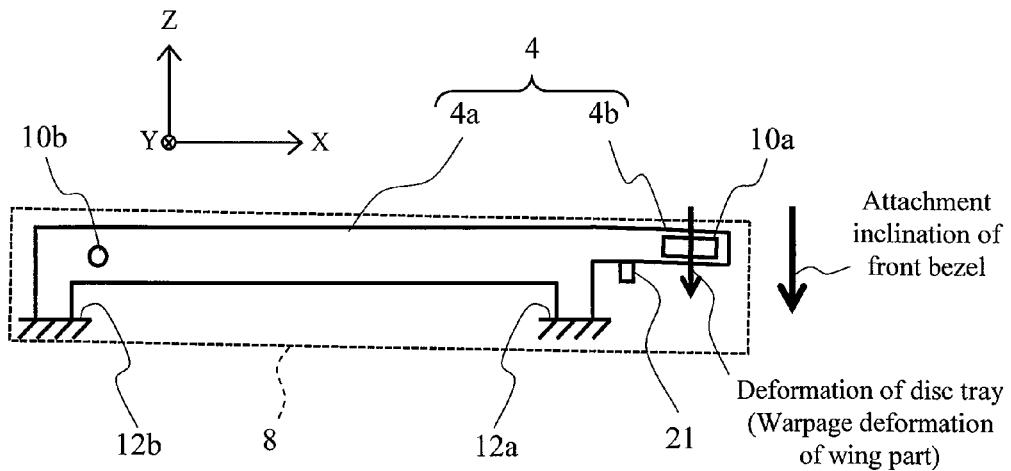
FIG. 4 is a schematic view showing a deformation suppressing effect of a wing part in the deformation suppressing structure.
Figure 4B:
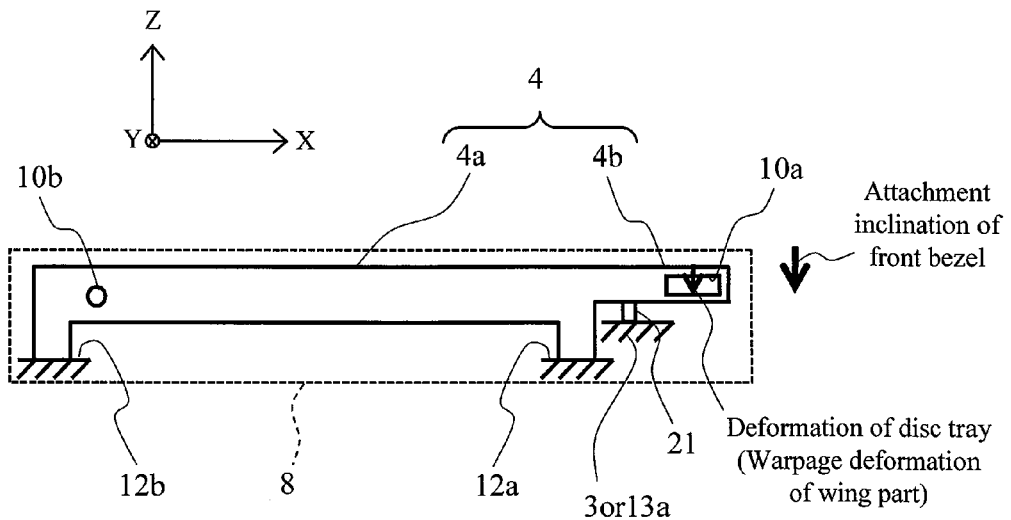

FIG. 4A is a schematic view of a supporting structure of the disc tray when the disc tray including the front bezel is ejected from the interior space of the drive housing, and FIG. 4B is a schematic view of the supporting structure of the disc tray when the disc tray including the front bezel is stored in the interior space of the drive housing.

The X direction, Y direction, and Z direction as shown in the drawing correspond to the width direction, depth direction, and height direction of the drive housing 1' and the optical disc drive 1 as viewed from the tray insertion/ejection opening 15 as shown in FIGS. 1 to 3. The posture of the front bezel 8 attached by engaging the first and second hook pieces 9a and 9b to the first and second hook piece engagement parts 10a and 10b at the front surface of the disc tray 4 is shown by a dashed line in the drawing.

When the disc tray 4 including the front bezel 8 is ejected from the interior space of the drive housing 1' through the tray insertion/ejection opening 15 as shown in FIG. 4A, the disc tray 4 is supported by the guide mechanisms 12a and 12b arranged on the both sides of the first space S1 of the bottom case 3 in the width direction (i.e., X direction in the drawing) so that the tray body 4a is slidable in the interior space of the drive housing 1' in the depth direction (i.e., Y direction in the drawing).

At this time, the wing part 4b is ejected from the second space S2 in the interior space of the drive housing 1' through the tray insertion/ejection opening 15. Accordingly, the wing part 4b is deformed downwardly in initial deformation during resin molding in the height (thickness) direction (i.e., Z direction in the drawing) of the disc tray 4 as shown by the arrow in the drawing. In other words, the initial deformation is not suppressed. Accordingly, the first hook piece engagement part 10a provided on the front end of the wing part 4b on the disc tray 4 in the depth direction (i.e., Y direction in the drawing) is moved downwardly from its original state in the height direction (i.e., Z direction in the drawing) of the disc tray 4 due to the initial deformation of the disc tray 4. On the other hand, the second hook piece engagement part 10b provided on the tray body 4a to be opposite to the first hook piece engagement part 10a in the width direction (i.e., X direction in the drawing) is not affected by the initial deformation on the tray body 4a, and accordingly, is not moved from its original state.

With the front bezel 8 fixed to the front surface of the disc tray 4 at this state according to movement displacement of the first hook piece engagement part 10a due to the initial deformation of the wing part 4b, the front bezel 8 engages in the height direction (i.e., Z direction in the drawing) of the disc tray 4 as shown by the arrow in FIG. 4A, resulting in the side close to the wing part 4b of the disc tray 4, i.e., the side where the disc protrudes, inevitably inclined downwardly relative to the opposite side close to the tray body 4a.

In the optical disc drive 1 according to this embodiment, the protrusion 21, which protrudes on the back face of the wing part 4b of the disc tray 4 toward the upper bottom part of the bottom case 3 on the side where the disc protrudes in the height (thickness) direction (i.e., Z direction in the drawing) of the tray body 4a or the upper end of the guide rack 13a in the height direction (i.e., Z direction in the drawing) suppresses (corrects) the initial deformation of the wing part 4b of the disc tray 4. The protrusion 21 provides the deformation suppressing structure for correcting the posture of the front bezel 8 to fit into the tray insertion/ejection opening 15 of the disc tray 4.

As shown in FIG. 4A, when the disc tray 4 is stored in the interior space of the drive housing 1', the protrusion 21 positioned on the back face of the wing part 4b of the disc tray 4 runs upon the upper bottom part of the bottom case 3 on the side where the disc protrudes or the upper end of the guide rack 13a in the height direction (i.e., Z direction in the drawing) before the front bezel 8 covers the tray insertion/ejection opening 15. The protrusion 21 is brought into contact with the upper bottom part or the upper end to press the upper bottom part or the upper end.

The tray body 4a is thicker than the wing part 4b in the height (thickness) direction (i.e., Z direction in the drawing) of the disc tray 4. The both ends of the tray body 4a in the width direction (i.e., X direction in the drawing) are supported by the drive housing 1' via the guide mechanisms 12a and 12b, and accordingly, the deformation or movement of the disc tray 4 in the height (thickness) direction (i.e., Z direction in the drawing) of the tray body 4a is restricted. Thus, the protrusion 21 stands on the upper bottom part of the bottom case 3 or the upper end of the guide rack 13a by the force received from the upper bottom part of the bottom case 3 or the upper end of the guide rack 13a in the height direction (i.e., Z direction in the drawing) and presses the wing part 4b to loosen the wing part 4b in the direction opposite to the direction where the wing part 4b is deformed.

Accordingly, the wing part 4b of the disc tray 4 is loosened to suppress (corrects or compensate) the initial deformation of the wing part 4b relative to the tray body 4a. The initial deformation of the wing part 4b can be suppressed when the disc tray 4 is inserted into the drive housing.

At this time, the first hook piece engagement part 10a formed on the front end of the wing part 4b of the disc tray 4 is lifted up in the height (thickness) direction (i.e., Z direction in the drawing) of the disc tray 4 to be positioned in the same straight line with the second hook piece engagement piece 10b formed on the front surface 4f of the tray body 4a in the width direction (i.e., X direction in the drawing) of the tray body 4a.

When the disc tray 4 is inserted into the interior space of the drive housing 1', the protrusion 21 arranged on the back face of the wing part 4b of the disc tray 4 runs upon the upper bottom part of the bottom case 3 on the side where the disc protrudes in the drive housing 1' or the upper end of the guide rack 13a in the height (thickness) direction (i.e., Z direction in the drawing) to be contacted thereto before the front bezel 8 covers the tray insertion/ejection opening 15. Accordingly, the initial deformation of the wing part 4b of the disc tray 4 is suppressed and the inclination of the first hook piece engagement part 10a is also suppressed. Thus, before the front bezel 8 covers the tray insertion/ejection opening 15 of the drive housing 1', the width direction of the front bezel 8 becomes in parallel to the width direction (i.e., X direction in the drawing) of the tray insertion/ejection opening 15.

The front bezel 8 which is inclined by the initial deformation of the wing part 4b of the disc tray 4 is prevented from failing to be fitted to an opening for a disc device provided in a housing of an electronic device when the optical disc drive 1 according to the embodiment is assembled into the electronic device.

In the optical disc drive 1 according to the embodiment, the disc tray 4 stored in the interior space of the drive housing 1' is tightly attached to the guide mechanisms 12a and 12b and the drive housing 1' via the protrusion 21 that is in contact with the upper bottom part of the bottom case 3 on the side where the disc protrudes in the drive housing 1' or the upper end of the guide rack 13a in the height direction (i.e., Z direction in the drawing). Accordingly, the contact vibration between parts arranged at narrow spaces from the wing part 4b of the disc tray 4 or the tray body 4a (for example, between the guide racks 13a and 13b and the guide rack slides 14a and 14b in the guide mechanisms 12a and 12b, between the guide rack slides 14a and 14b and the disc tray 4) is suppressed.

FIG. 5 is a perspective view showing a state where the disc tray is inserted into the interior space of the drive housing in the optical disc drive as described above.

Figure 5A:
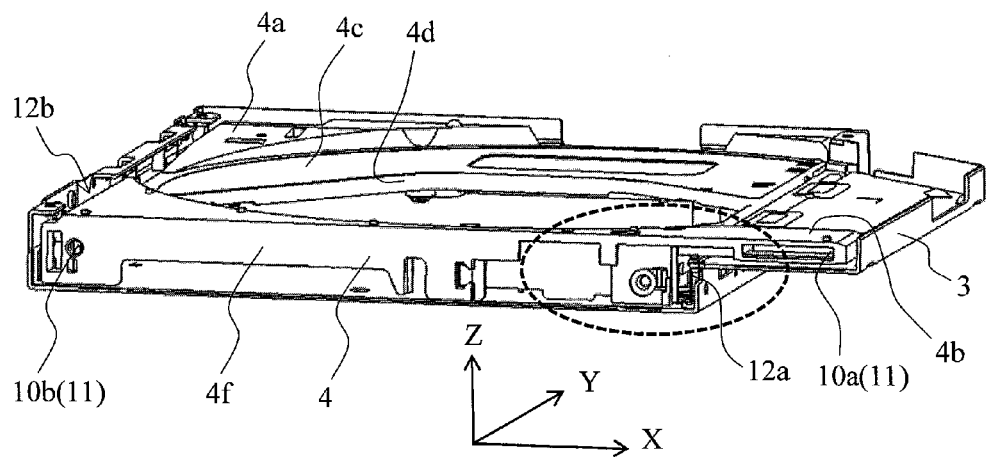
FIG. 5 is a perspective view showing a state where the disc tray is inserted into an interior space of a drive housing.
Figure 5B:
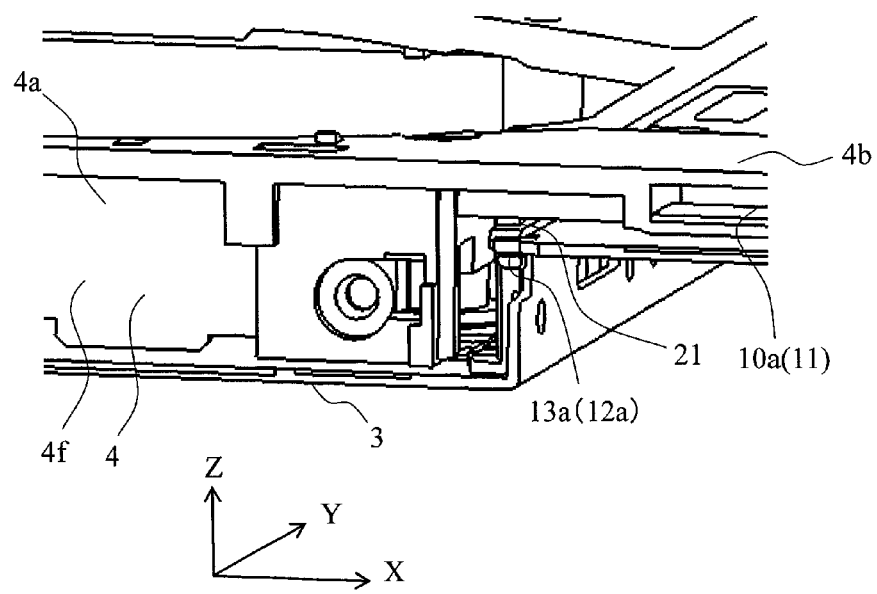

FIG. 5A is a perspective view of the tray insertion/ejection opening as viewed from the front side, and FIG. 5B is an enlarged view of the root portion of the wing part shown by a dashed line in FIG. 5A.

When the wing part 4b is stored in the second space S2 in the interior space of the drive housing 1', the protrusion 21 is arranged at the position in the width direction (i.e., X direction in the drawing) of the disc tray 4 which faces the upper end of the guide rack 13a fixed to the side where the disc protrudes in the height direction (i.e., Z direction in the drawing).

While the disc tray 4 is stored in the interior space of the drive housing 1', the protrusion 21 arranged on the back face of the wing part 4b of the disc tray 4 runs on the upper end of the guide rack 13a of the first guide mechanism 12a in the height direction (i.e., Z direction in the drawing) to be brought into contact with the upper end for pressing the upper end before the front bezel 8 covers the tray insertion/ejection opening 15.

The protrusion 21 stands on the upper end of the guide rack 13a in the height direction (i.e., Z direction in the drawing) by the force received from the upper end of the guide rack 13a in the height direction (i.e., Z direction in the drawing). The protrusion 21 presses the wing part 4b so that the wing part 4b is loosened in the direction opposite to the direction where the wing part 4b is deformed during molding.

Thus, the initial deformation of the wing part 4b of the disc tray 4 during molding is suppressed, and accordingly, the inclination of the front bezel 8 attached to the front surface of the disc tray 4 can be suppressed.

Since the wing part 4b is pressed to be loosened in the direction opposite to the direction where the wing part 4b is deformed during molding, the guide surface of the guide rack slide 14a is moved upwardly in the height direction (i.e., Z direction in the drawing) so that the tray body 4a of the disc tray 4 is tightly attached to the guide surface of the guide rack slide 14a in the height direction (i.e., Z direction in the drawing). Accordingly, the disc tray 4 and the guide rack slide 14a move the guide surface of the guide rack 13a upwardly in the height direction (i.e., Z direction in the drawing). At the same time, the guide rack 13a is pressed downwardly toward the lower bottom part of the bottom case 3 in the height direction (i.e., Z direction in the drawing) by the force received from the protrusion 21 of the wing part 4b of the disc tray 4. As long as the guide rack 13a has the guide surface that can be contacted to the guide rack slide 14a at least partially in the height direction (i.e., Z direction in the drawing), the disc tray 4 and the guide rack slide 14a are tightly attached to the guide surface of the guide rack 13a in the height direction (i.e., Z direction in the drawing). Consequently, the contact vibration generated between narrow spaces of the parts when the optical disc drive 1 is operated (for example, between the guide racks 13a and 13b and the guide rack slides 14a and 14b in the guide mechanisms 12a and 12b, between the guide rack slides 14a and 14b and the disc tray 4) is prevented.

The protrusion 21 is formed on the wing part 4b on the front side of the disc tray 4 in the depth direction (i.e., Y direction in the drawing). Just before the front bezel 8 covers the tray insertion/ejection opening 15, the protrusion 21 runs on the upper end of the guide rack 13a of the first guide mechanism 12a in the height direction (i.e., Z direction in the drawing). Thus, the period where the protrusion 21 and the upper end of the guide rack 13a are contacted to each other in the height direction (i.e., Z direction in the drawing) during insertion and ejection of the disc tray 4 can be minimized. The smooth insertion and ejection of the disc tray 4 are not prevented.

The optical disc drive 1 according to the embodiment is structured as described above. However, the specific structure of each part is not limited thereto.

For example, the protrusion 21 is shaped like a column according to the embodiment, but may be shaped like a dome, pyramid, or the like. As long as the protrusion 21 protrudes from the wing part 4b of the disc tray 4 to be slidably contacted to the upper bottom part of the bottom case 3 on the side where the disc protrudes or the upper end of the guide rack 13a in the height direction (i.e., Z direction in the drawing), the same advantageous effects can be obtained.

The protrusion 21 may be made of a material different from that of the disc tray 4 and fixed to the disc tray 4 having the tray body 4a and the wing part 4b that are integrated with each other by injection molding of resin.

The shape of the distal end of the protrusion 21 is not limited to an inclined shape, but may be a curved shape having sliding property. The protrusion 21 and its distal end may be made of an elastic member having sliding property to lessen the vibration or impact transmitted from the outside of the drive to the unit mechanism 7 via the drive housing 1' or the vibration or impact transmitted from the unit mechanism 7 to the outside of the drive via the drive housing 1'.

The protrusion 21 is arranged to protrude toward the upper bottom part of the bottom case 3 from the wing part 4b of the disc tray 4 according to the embodiment. However, the protrusion 21 may be provided on the upper bottom part of the bottom case 3 or the upper end of the guide rack 13a in the height direction (i.e., Z direction in the drawing) on the side close to the tray insertion/ejection opening 15 in the depth direction (i.e., Y direction in the drawing) to be slidably contacted to the lower surface of the wing part 4b of the disc tray 4, so that the wing part 4b is loosened in the direction opposite to the direction where the wing part 4b is deformed during molding.

DESCRIPTION OF SYMBOLS

1: optical disc drive, 1': drive housing, 2: top case, 3: bottom case, 4: disc tray, 4a: tray body, 4b: wing part, 4c: disc mounting part, 4d: mounting hole, 5: spindle motor, 6: optical pickup, 7: unit mechanism, 7a: cover, 8: front bezel, 9a, 9b: first, second hook piece, 10a, 10b: first, second hook piece engagement part, 11: engagement means, 12a, 12b: guide mechanism, 13a, 13b: guide rack, 14a, 14b: guide rack slide, 15: tray insertion/ejection opening, 21: protrusion (deformation suppressing structure)

What is claimed is:

1. An optical disc drive, comprising:
   a housing including an opening;
   a disc tray including a tray body on which a disc is mounted and from which the disc protrudes, and a wing part protruding from a side of the tray body where the disc protrudes, the tray body and the wing part being integrally molded with the disc tray;
   a guide mechanism slidably supporting the tray body for inserting the disc tray into the housing or ejecting the disc tray from the housing through the opening; and
   a bezel engaged with the tray body and the wing part to be attached to the disc tray for covering the opening when the disc tray is stored in the housing,
   wherein a protrusion is formed at a root portion of the wing part, which is closer to the tray body than a distal end of the wing part, to contact an upper end of the guide mechanism when the disc tray is stored in the housing for suppressing initial deformation of the wing part.

2. The optical disc drive according to claim 1, wherein the protrusion has an inclined surface on a distal end thereof for running upon the upper end of the guide mechanism.

3. The optical disc drive according to claim 1, wherein the protrusion has an inclined surface on a distal end thereof for running upon the upper end of the guide mechanism.

4. The optical disc drive according to claim 1, wherein the protrusion has an inclined surface on a distal end thereof to allow the root portion, adjacent to the tray body, of the wing part to run on the protrusion.

5. An optical disc drive, comprising:
   a housing including an opening;
   a disc tray including a tray body on which a disc is mounted and from which the disc protrudes, and a wing part protruding from a side of the tray body where the disc protrudes, the tray body and the wing part being integrally molded with the disc tray;
   a guide mechanism slidably supporting the tray body for inserting the disc tray into the housing or ejecting the disc tray from the housing through the opening; and
   a bezel engaged with the tray body and the wing part to be attached to the disc tray for covering the opening when the disc tray is stored in the housing,
   wherein a protrusion is formed on an upper end of the guide mechanism opposite to the wing part of the disc tray to contact a root portion of the wing part, which is closer to the tray body than a distal end of the wing part, when the disc tray is stored in the housing for suppressing initial deformation of the wing part.

6. The optical disc drive according to claim 5, wherein the protrusion has an inclined surface on a distal end thereof to allow the root portion, which is closer to the tray body, of the wing part to run on the protrusion.

7. An optical disc drive, comprising:
   a housing with an opening, wherein a portion that forms a bottom face of an interior space of the housing, as viewed from the opening, has a shape of a two-stage bottom face including a lower bottom part and an upper bottom part that are defined by a stepped portion that extends along a depth direction;
   a disc tray including a tray body on which a disc is mounted and from which the disc protrudes, and a wing part protruding from a side of the tray body where the disc protrudes, the tray body and the wing part being integrally molded with the disc tray;
   a guide mechanism slidably supporting the tray body for inserting the disc tray into or ejecting the disc tray from the interior space of the housing with the shape of the two-stage bottom face through the opening; and
   a bezel engaged with the tray body and the wing part to be attached to the disc tray for covering the opening when the disc tray is stored in the interior space of the housing,
   wherein a protrusion is formed at a root portion of the wing part, which is closer to the tray body than a distal end of the wing part, to contact an edge around the stepped portion of the upper bottom part that is opposite to the wing part when the disc tray is stored in the interior space of the housing for suppressing initial deformation of the wing part.

8. An optical disc drive, comprising:
   a housing with an opening, wherein a portion that forms a bottom face of an interior space of the housing, as viewed from the opening, has a shape of a two-stage bottom shape including a lower bottom part and an upper bottom part that are defined by a stepped portion that extends along a depth direction;
   a disc tray including a tray body on which a disc is mounted and from which the disc protrudes, and a wing part protruding from a side of the tray body where the disc protrudes, the tray body and the wing part being integrally molded with the disc tray;
   a guide mechanism slidably supporting the tray body for inserting the disc tray into or ejecting the disc tray from the interior space of the housing with the shape of the two-stage bottom face through the opening; and a bezel engaged with the tray body and the wing part to be attached to the disc tray for covering the opening when the disc tray is stored in the interior space of the housing, wherein a protrusion is formed at an edge around the stepped portion of the upper bottom part that is opposite to the wing part of the disc tray to contact a root portion of the wing part, which is closer to the tray body than a distal end of the wing part, for suppressing initial deformation of the wing part.

* * * * *